(12) United States Patent
Vicente Oliveros et al.

(10) Patent No.: US 12,467,858 B2
(45) Date of Patent: Nov. 11, 2025

(54) GAS DETECTION IN AN ENCLOSED SPACE

(71) Applicants: AIRBUS OPERATIONS, S.L.U., Madrid (ES); AIRBUS OPERATIONS LTD, Bristol (GB)

(72) Inventors: David Vicente Oliveros, Madrid (ES); Christopher J. Woods, Bristol (GB)

(73) Assignees: AIRBUS OPERATIONS, S.L.U, Madrid (ES); AIRBUS OPERATIONS LIMITED, Bristol (GB)

( * ) Notice: Subject to any disclaimer, the term of this patent is extended or adjusted under 35 U.S.C. 154(b) by 425 days.

(21) Appl. No.: 18/088,403

(22) Filed: Dec. 23, 2022

(65) Prior Publication Data
US 2023/0280269 A1 Sep. 7, 2023

(30) Foreign Application Priority Data
Mar. 3, 2022 (EP) .................... 22382195

(51) Int. Cl.
*G01N 21/3504* (2014.01)
*B64D 45/00* (2006.01)
*G01N 21/85* (2006.01)
*G08B 21/12* (2006.01)

(52) U.S. Cl.
CPC ......... *G01N 21/3504* (2013.01); *B64D 45/00* (2013.01); *G01N 21/85* (2013.01); *G08B 21/12* (2013.01); *B64D 2045/009* (2013.01)

(58) Field of Classification Search
CPC ... G01L 11/02; B64D 45/00; B64D 2045/009; G01N 21/65; G01N 21/33; G01N 21/85; G01N 21/3504; G01N 21/53; G01M 3/04; G01M 3/38; G08B 21/12
See application file for complete search history.

(56) References Cited

U.S. PATENT DOCUMENTS

| | | |
|---|---|---|
| 3,549,882 A | 12/1970 | Barrington |
| 2010/0170326 A1 | 7/2010 | Miller et al. |
| 2018/0188166 A1 | 7/2018 | Zeller et al. |

FOREIGN PATENT DOCUMENTS

| | | |
|---|---|---|
| EP | 1 602 918 | 12/2005 |
| EP | 2 378 277 A2 | 10/2011 |
| EP | 2 378 277 A3 | 10/2011 |

OTHER PUBLICATIONS

European Search Report for EP 22382195.0, mailed Aug. 10, 2022, 9 pages.

*Primary Examiner* — An H Do
(74) *Attorney, Agent, or Firm* — Nixon & Vanderhye P.C.

(57) ABSTRACT

A gas detection system that detects gas inside an enclosed space of an aircraft system on board in an aircraft. The system is used in a method for determining the presence of a gas inside an aircraft system by means of a detection system installed on the aircraft system. The system monitors and/or detects a vacuum leak or of fire inside an aircraft system arranged in an aircraft.

18 Claims, 4 Drawing Sheets

GAS DETECTION IN AN ENCLOSED SPACE

RELATED APPLICATION

This application incorporates by reference in its entirety and claims priority to European Patent Application EP 22382195.0, filed Mar. 3, 2022.

TECHNICAL FIELD

The present invention belongs to the field of gas detection, and particularly, to the field of gas detection inside an enclosed space on board in an aircraft.

In particular, the invention provides an aircraft system and a method for determining the presence of gas inside an enclosed space by means of a detection system installed on the aircraft system. Possible non-limiting applications of the present invention are monitoring and/or detection of vacuum leak or of fire inside an enclosed space arranged in an aircraft.

BACKGROUND

In systems for the gauging and distribution of cryogenic liquid and/or gas in aircraft systems a vacuum insulation is sometimes required. For example, distribution pipes through which hydrogen ($H_2$) or liquid hydrogen ($LH_2$) flows are vacuum isolated by a vacuum jacket that covers the $H_2$ or $LH_2$ distribution pipe. It is necessary to monitor the integrity of the vacuum insulation in order to detect possible failures in time. Specifically, a failure in a vacuum jacket may cause heat ingress into the $LH_2$ distribution pipe, potentially leading to gasification and increase in pressure, finally resulting in shutdown of the system where the distribution pipe is located.

There are several known means to monitor a vacuum inside a jacket either directly by measuring the gas pressure or density, or indirectly by measuring the temperature of the outer surface of the vacuum jacket. Some detection techniques are not very quick, such as detection based on temperature for example. Indeed, for the temperature to change sufficiently significantly to be detected, the leak must be important or have been present for a long time. In the direct techniques, it is necessary to introduce specific sensors inside the jacket. Some vacuum jackets already incorporate these sensors installed inside. In either case it is necessary to invade the interior of the vacuum jacket and when change and/or repair of the sensor is required due to possible failure thereof, the vacuum jacket must be manipulated to enter inside to reach the sensor.

Furthermore, there is the need to monitor the presence of fire or future fire inside a closed space, such as in fuel cell encapsulations, especially fuel cell encapsulation located in aircraft.

To predict fire formation or detect fire in enclosed spaces, means are known for monitoring gases inside said enclosed spaces. These means may monitor the fire either directly by detection of UV (ultraviolet) light or IR (infrared) light coming from the fire, or indirectly by measuring temperature gradient. These techniques do not provide an early detection and imply the same drawbacks as the ones mentioned above for vacuum leak detection.

SUMMARY

There is a need to correctly monitor the possible leaks of vacuum or the presence of fire inside closed spaces. The present invention may be embodied to satisfy this need with a detection system for determining the presence of gas inside an enclosed space. In addition, the present invention may be used to provide early detection of vacuum leaks and fire.

In a first inventive aspect, the invention may be embodied to provide an aircraft system comprising: an enclosure which defines an enclosed space, and a detection system for detecting gas inside the enclosed space, the detection system comprising: a radiation source arranged outside the enclosed space and configured to emit an electromagnetic radiation into the enclosed space, a radiation detector arranged outside the enclosed space and configured to receive electromagnetic radiation from the enclosed space.

The present invention provides an enclosed space that is understood as a region that is completely closed, in some embodiments hermetically closed.

The aircraft system comprises an enclosure that encloses the mentioned enclosed space or region within an inner volume of the enclosure.

In an embodiment, the enclosure is an encapsulation of a fuel cell, wherein the fuel cell is housed in the inner volume defined by the encapsulation.

In an embodiment, the enclosure is a vacuum jacket of a distribution pipe or tank, and preferably a vacuum jacket of a fuel distribution pipe or fuel tank, wherein the fuel distribution pipe or tank is housed in the inner volume defined by the vacuum jacket and there is vacuum between the fuel distribution pipe or fuel tank and the vacuum jacket.

The aircraft system also comprises a detection system configured to detect gas inside the enclosed space. Specifically, the detection system is installed outside the enclosed space (i.e., outside the enclosure), but with the ability to interact with the inner volume of the enclosure.

The detection system comprises a radiation source and a radiation detector both being located outside the enclosure. In particular, the radiation source is configured to emit an electromagnetic radiation into the enclosed space, where the presence of gas is to be assessed. On the other hand, the radiation detector is configured to receive electromagnetic radiation from the inside of the enclosure, that is, from the enclosed space.

That is, the radiation source is able to emit an electromagnetic radiation into the inner volume of the enclosure so that, if there are gas molecules present in the enclosed space, the gas molecules will be excited by their interaction with the emitted radiation and they will re-emit electromagnetic radiation. The main part of the electromagnetic radiation re-emitted by the gas molecules will have the same wavelength as the electromagnetic radiation emitted by the radiation source (Rayleigh scattered radiation), but a small part of the re-emitted electromagnetic radiation will have a wavelength different from the wavelength of the electromagnetic radiation emitted by the radiation source (Raman scattered radiation). The radiation detector detects the electromagnetic radiation emitted by the gas molecules, if any, when they are excited as a result of the radiation previously emitted by the radiation source of the present detection system. Detection of Rayleigh scattered radiation allows determining the presence of gas. Detection of Raman scattered radiation allows determining not only the presence of gas but also the composition of the gas, since the change in wavelength of Raman scattered radiation is characteristic to the chemical composition of the gas.

The enclosure and in particular its walls are configured (at least a portion of these) to allow the passage of the electromagnetic radiation from outside to inside of the enclosure and/or from inside to outside of the enclosure.

Based on the radiation above a set threshold detected by the radiation detector (or on the absence of detected radiation above a set threshold), the detection system is able to determine the presence of gas in the enclosed space, i.e., the detection system determines whether or not there is gas in the enclosed space. Advantageously, by determining the presence of gas in the enclosed space, the present detection system allows monitoring and detecting potential risks and/or failures. For example, when gas is detected inside the vacuum jacket of a fuel distribution pipe or fuel tank a vacuum failure can be detected. Also, when gas is detected inside a fuel cell encapsulation, early detection of a fire risk inside the fuel cell encapsulation is allowed.

Thus, according to an embodiment of the invention, the presence of vacuum leaks in a vacuum enclosure or jacket that encloses fuel distribution pipes or fuel tanks are duly detected. Early detection of vacuum failure avoids the gasification and the increase of pressure inside the fuel distribution pipe or fuel tank.

Furthermore, the fact that the detection system is located outside the enclosure advantageously ensures that, if it is necessary to replace and/or repair the detection system or any of its components, it is not needed to penetrate the interior of the enclosure (its inner volume), thus maintaining the vacuum integrity.

Also, the detection system is protected by the enclosure in case of fire in the enclosed space.

Furthermore, the presence of the detection system outside the enclosure allows for easier manufacture of the enclosure.

In an embodiment, the detection system is configured to detect at least hydrogen, nitrogen and/or oxygen.

In a particular embodiment, the radiation source is configured to emit ultraviolet (UV) light radiation, which is a form of electromagnetic radiation.

In a particular embodiment, the radiation detector is configured to detect UV radiation.

The UV radiation is scattered by gas molecules present in the enclosed space, and as a consequence the radiation they re-emit is detected by the UV radiation detector. The UV radiation detector is adapted to detect UV radiation corresponding to Rayleigh scattered radiation that is re-emitted by the gas molecules present in the enclosed space.

In other embodiments, the radiation detector is configured to detect radiation in a larger waveband than UV only. Indeed, the UV radiation emitted by the radiation source excites the gas molecules present in the enclosed space, and as a consequence of the excitation of the gas molecules, these gas molecules re-emit radiation in various wavelengths. Specifically, analysis of the wavelengths of light re-emitted from the enclosed space allows to determine the composition of gas present in the enclosed space. Advantageously, by identifying the composition of gas present in a vacuum jacket, the present invention allows determining whether the leak is external to the vacuum jacket or internal from the fuel distribution pipe or tank within the vacuum jacket.

In a particular embodiment, the radiation detector is configured to detect light radiation and comprises a spectrometer. The spectrometer is adapted to detect radiation corresponding to Raman scattered radiation that is re-emitted by gas molecules present in the enclosed space.

The use of a spectrometer allows to detect very small amounts of unsuitable gases, thus providing a very early detection of vacuum leaks and fire compared to other techniques such as temperature or pressure change.

In a particular embodiment, the detection system comprises at least one optical fiber arranged to transmit radiation from the radiation source to the enclosed space and/or to transmit radiation from the enclosed space to the radiation detector. In an embodiment, the optical fiber comprises a lens at the end closer to the enclosed space, i.e., the end of the optical fiber opposite to where the optical fiber connects to the radiation source and/or radiation receiver.

The use of optical fiber in the detection system allows to route and guide the radiation from the radiation source to the enclosed space and/or from the enclosed space to the radiation detector, thus advantageously simplifying routing constraints and providing electromagnetic interference immunity.

In a particular embodiment, the at least one optical fiber comprises a first optical fiber and a second optical fiber. One of these optical fibers is intended to transmit radiation from the radiation source into the enclosed space and the other optical fiber is intended to receive radiation from the enclosed space and to transmit said radiation to the radiation detector.

In a particular embodiment the detection system comprises: transmission optics configured to direct radiation from the radiation source into the enclosed space, such that the transmission optics is adapted to form at least one radiating beam, reception optics configured to receive radiation from the enclosed space, such that the reception optics has a field of view from which it may receive radiations, wherein the transmission optics and the reception optics are arranged such that the radiating beam and the field of view intersect with a non-zero angle at an intersecting region within the enclosed space, wherein the transmission optics and the reception optics are arranged such that the intersecting region does not intersect any portion of the enclosure.

According to this embodiment, the transmission optics and the reception optics are oriented such that the direction in which the radiation enters the enclosure and the direction in which radiation enters the reception optics from the enclosure form a non-zero angle. The region where the at least one radiating beam from the transmission optics and the field of view of the reception optics intersect is referred to herein as "intersecting region". The transmission optics and the reception optics are arranged such that the intersecting region does not intersect any wall or portion of the enclosure.

Advantageously, according to this embodiment, the portion of enclosure irradiated by the radiating beam from the transmission optics is not within the field of view of the reception optics. Thus, Rayleigh emissions from the material of the portion of enclosure that receives the radiation from the radiation source are not within the field of view of the reception optics, which allows to avoid or at least reduce noise caused by Rayleigh scattering from said material of the enclosure, thereby improving the sensitivity of the system.

In an embodiment, the transmission optics comprises at least one optical element, such as one or more mirror or lens.

In an embodiment, the transmission optics is fiber-coupled to the radiation source.

In an embodiment, the reception optics comprises at least one optical element, such as one or more mirror or lens.

In an embodiment, the reception optics is fiber-coupled to the radiation detector.

According to an embodiment wherein the enclosure is a vacuum jacket of a distribution pipe or tank, preferably a vacuum jacket of a fuel distribution pipe or fuel tank, the enclosed space comprises a first vacuum space and a second vacuum space, the first vacuum space and the second vacuum space being separated from each other by an intermediate wall; the radiation source of the detection system is configured to emit an electromagnetic radiation into the first vacuum space and the second vacuum space; the radiation detector of the detection system is configured to receive electromagnetic radiation from the inside of the first vacuum space; and the detection system comprises a second radiation detector arranged outside the enclosed space and being configured to receive electromagnetic radiation from the inside of the first vacuum space and the second vacuum space.

That is, the enclosed space of the enclosure is divided at least into two regions. These two vacuum spaces are separated from each other by an intermediate wall comprised in the enclosed space so that the second vacuum space surrounds the fuel distribution pipe or fuel tank and the first vacuum space surrounds the second vacuum space. In other words, the radiation emitted by the detection system first goes through the first vacuum space and then continues through the second vacuum space.

Furthermore, the detection system is configured to detect gas inside these two vacuum spaces. Specifically, the detection system is able to emit an electromagnetic radiation into both first and second vacuum spaces. Also, the presence of two radiation detectors allows the detection system to receive electromagnetic radiation from the first vacuum space by one radiation detector and from the first and second vacuum spaces by the additional radiation detector. In this sense, the intermediate wall is configured to allow the electromagnetic radiation to pass through only in the region where the second radiation detector is placed. In this embodiment, the detection system comprises a single radiation source configured to emit an electromagnetic radiation into both first and second vacuum spaces. Said electromagnetic radiation may be guided using one or more optical fibers. In another embodiment the detection system comprises two radiation sources, namely a first radiation source configured to emit an electromagnetic radiation into the first vacuum space and a second radiation source configured to emit an electromagnetic radiation into both first and second vacuum spaces. Said electromagnetic radiation may be guided using an optical fiber.

Each vacuum space may have a different vacuum regime. In a particular embodiment, the first vacuum space has a medium vacuum regime and the second vacuum space has an ultra-high vacuum regime.

In a more particular embodiment wherein the enclosure comprises two vacuum spaces separated from each other by an intermediate wall, the intermediate wall comprises an intermediate window, and the detection system is configured to emit electromagnetic radiation into the inside of the second vacuum space and/or receive electromagnetic radiation from the inside of the second vacuum space passing through the intermediate window. This intermediate window is a portion of the intermediate wall of a different nature, for example a different material, that maintains the continuity of the closure of the enclosure at the intermediate wall but allows the passage of radiation between the first vacuum space and the second vacuum space.

In a particular embodiment, the enclosure comprises at least a first window through which the detection system is configured to emit electromagnetic radiation into the enclosed space and/or receive electromagnetic radiation from the inside of the enclosed space.

The window corresponds to a portion of the enclosure of a different nature, for example of a different material, that maintains the continuity of the closure of the enclosure and allows the passage of radiation from the detection system towards inside the enclosure and from inside the enclosure towards the detection system. The presence of at least one window in the enclosure facilitates the use of the detection system. That is, this facilitates the passage of the radiation towards the enclosed space and also the reception of radiation from the enclosed space.

Both the radiation source and the radiation detector are located so that the radiation source focuses the emitted radiation towards the first window and that a radiation coming from the enclosed space through the first window is perceived from the outside by the radiation detector.

In a more particular embodiment wherein the enclosure comprises two vacuum spaces separated from each other by an intermediate wall, the intermediate wall comprises an intermediate window, and the detection system is configured to emit electromagnetic radiation into the inside of the second vacuum space and/or receive electromagnetic radiation from the inside of the second vacuum space passing through the first window and the intermediate window. This intermediate window is a portion of the intermediate wall of a different nature, for example a different material, that maintains the continuity of the closure of the enclosure at the intermediate wall but allows the passage of radiation between the first vacuum space and the second vacuum space.

In a particular embodiment, the enclosure comprises a first window through which the radiation source is configured to emit electromagnetic radiation into the inside of the enclosed space and a second window through which the radiation detector is configured to receive electromagnetic radiation from the inside of the enclosed space. This embodiment proposes the provision of separate windows for the radiation source and the radiation detector of the detection system. In an embodiment, the detection system is arranged outside the enclosure in such a way that the radiation source is located in front of the first window towards inside the enclosure and the radiation detector is located in front of the second window towards the inside of the enclosure.

In an embodiment, the detection system is provided with the transmission optics and the reception optics as already described above and the enclosure comprises two vacuum spaces separated from each other by an intermediate wall with an intermediate window, also described above, so that the intersecting region may be provided within the first vacuum space or the second vacuum space. Furthermore, this embodiment may be also combined with the provision of at least a first window or a first and second windows as described in previous embodiments.

In a particular embodiment, the enclosure comprises an observation chamber, and the radiation source is configured to emit radiation into the observation chamber and the radiation detector is configured to receive radiation from the observation chamber.

The observation chamber will be understood as a chamber of the enclosed space so that there is continuity between the enclosed space volume and the observation chamber volume. Thus, the gas that may flow inside the enclosure also flows inside the observation chamber. Advantageously, the observation chamber allows a higher detectability and ease of installation of the detection system around this chamber than towards a tank or a pipe directly.

In a particular embodiment, the aircraft system comprises a plurality of detection systems. Advantageously, the presence of a plurality of detection systems allows the gas detection to be performed at different places of the enclosure.

In a second inventive aspect, the invention provides an aircraft comprising an aircraft system according to the first inventive aspect.

The invention is intended for any gas detection inside a closed space, preferably it is intended for enclosed spaces on board in an aircraft.

In a third inventive aspect, the invention provides a method for determining the presence of a gas inside an enclosed space of an aircraft system, wherein the aircraft system is according to the first inventive aspect, the method comprising the following steps:

(a) emitting a radiation into the enclosed space by the radiation source of the detection system;
(b) monitoring, by the radiation detector of the detection system, the presence of radiation emitted by gas molecules present in the enclosed space when the gas molecules interact with the radiation emitted by the radiation source, and
(c) determining the presence of gas in the enclosed space based on the monitored presence of radiation.

The present method is intended for determining the presence of a gas inside an enclosed space of an aircraft system by monitoring the inside of the enclosed space by a detection system.

First, according to step (a) a radiation from the radiation source of the detection system of the aircraft system is emitted towards inside the enclosure, particularly into the enclosed space of the enclosure. If there is gas present in the enclosed space, the gas molecules will be excited by their interaction with the radiation emitted by the radiation source and as a result these gas molecules will emit radiation that is detected and monitored by the radiation detector of the detection system according to step (b). Finally, based on the radiation detected by the radiation detector, the presence of a gas in the enclosed space is determined, i.e., it is determined whether there is a gas in the enclosed space or not. Determining the presence of gas in the enclosed space is based on the number of detected photons. Once the number of detected photons exceeds a set threshold then it is determined that a gas is present in the enclosed space. Thanks to this set threshold the photons detected from the gas can be differentiated from the noise within the detection system or from photons that may be emitted by the enclosure. The method may also comprise a step of triggering a signal based on the detection of a radiation above a set threshold.

Advantageously, the present method allows the detection of gas inside an enclosed space without penetrating the enclosure of the enclosed space. Furthermore, the present method provides an improved and accurate technique to determine the presence of gas inside an enclosure.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from preferred embodiments of the invention, given just as examples and not being limited thereto, with reference to the drawings.

DETAILED DESCRIPTION

Figure 1:
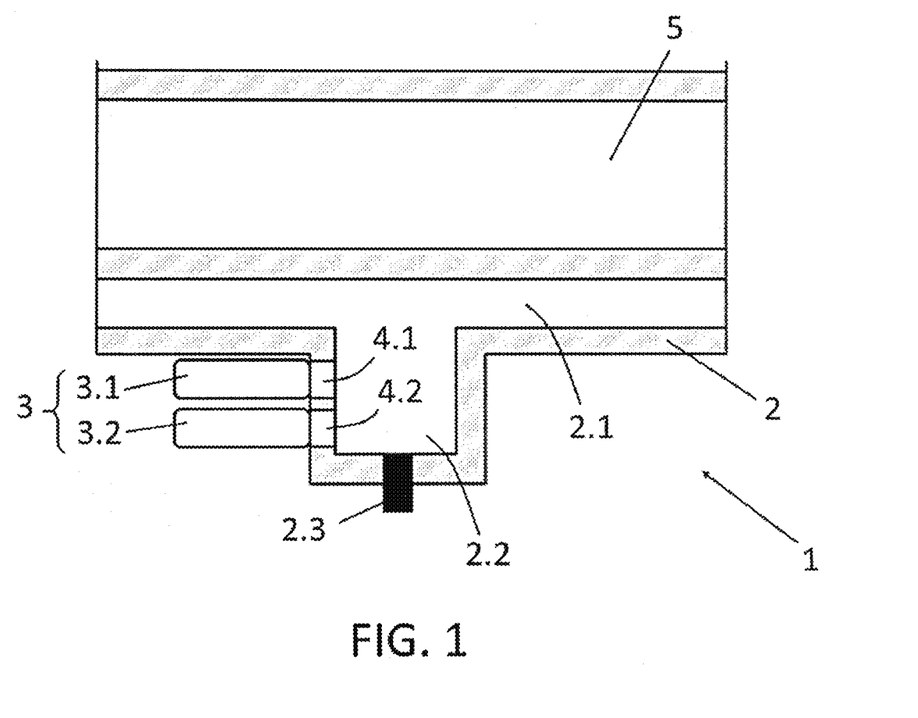
FIG. 1 shows a schematic view of the aircraft system according to a first embodiment of the invention.

FIG. 1 shows an exemplary embodiment of an aircraft system (1) according to the invention.

According to FIG. 1, the aircraft system (1) comprises an enclosure (2) defining an enclosed space (2.1). The aircraft system (1) further comprises a detection system (3) for detecting gas inside the enclosed space (2.1). The detection system (3) comprises a radiation source (3.1) that is arranged outside the enclosure (2) and is configured to emit electromagnetic radiation into the enclosed space (2.1), and a radiation detector (3.2) that is also arranged outside the enclosure (2) and configured to receive radiation from the enclosed space (2.1).

In the embodiment of FIG. 1, the enclosure (2) is a vacuum jacket enclosing a liquid hydrogen distribution pipe (5), where there is vacuum between the wall (5.1) of the liquid hydrogen distribution pipe (5) and the vacuum jacket. Although a vacuum jacket for a liquid hydrogen distribution pipe (5) has been described for this example, this does not limit the present invention and vacuum jackets could be provided for other distribution pipes or tanks for any fluid at very low or very high temperature that requires maintaining insulation.

In the embodiment shown on FIG. 1, the enclosure (2) comprises two windows, namely a first window (4.1) and a second window (4.2). These windows (4.1, 4.2) are arranged in the enclosure (2) structure allowing the interaction of the detection system (3) with the inside of the enclosure (2).

Specifically, the radiation source (3.1) is placed outside the enclosure (2), oriented towards the first window (4.1) in order to facilitate the emission of radiation from the radiation source (3.1) into the enclosed space (2.1). Further, the radiation detector (3.2) is also placed outside the enclosure (2) and oriented towards the second window (4.2) for facilitating the detection of radiation from the enclosed space (2.1). In a particular example, the radiation source (3.1) of the detection system (3) is configured to emit light having a wavelength of 355 nm to excite the gas molecules inside the enclosure (2), so that different gases respond to this particular wavelength of light.

In this embodiment, the aircraft system (1) further comprises an observation chamber (2.2) that defines a cavity or small chamber that projects away from the pipe (5) and houses part of the inner volume of the enclosure (2). The volume of the observation chamber (2.2) is smaller compared to the total inner volume of the enclosure, and this chamber (2.2) allows a higher detectability and ease of installation of the detection system (3) around the chamber (2.2) than towards the pipe (5).

According to FIG. 1, both first (4.1) and second (4.2) windows are located in the observation chamber (2.2), and the detection system (3) is arranged to interact with the inner volume inside the observation chamber (2.2). In particular, in this embodiment both windows (4.1, 4.2) are placed in the same wall of the observation chamber (2.2) so that the radiation source (3.1) and the radiation detector (3.2) both interact with the enclosed space (2.1) from the same wall or side of the observation chamber (2.2). In another example (not shown on the figures), the windows (4.1, 4.2) are placed in walls of the observation chamber (2.2), these walls may be opposed from each other. In these examples, each radiation source (3.1) and radiations detector (3.2) are arranged according to each of the windows (4.1, 4.2), respectively.

In another example (not shown on figures), the enclosure (2) comprises only one window and both radiation source and radiation detector are placed to respectively emit and receive radiation through said window.

In the embodiment of FIG. 1 the enclosure (2) comprises a vacuum port (2.3) arranged on the observation chamber (2.2) and through which the vacuum is provided inside the enclosure (2).

Figure 2:
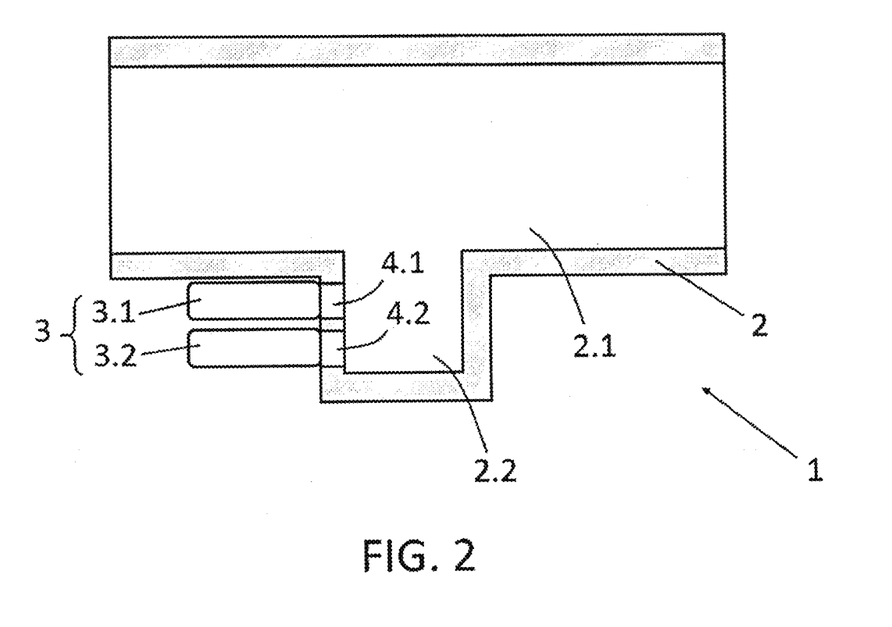
FIG. 2 shows a schematic view of the aircraft system according to a second embodiment of the invention.

FIG. 2 shows another exemplary embodiment of an aircraft system (1) that comprises an enclosure (2), namely an encapsulation enclosing a fuel cell (not shown). Also, the aircraft system (1) comprises a detection system (3) as described above for the embodiment of FIG. 1.

In an embodiment, the detection system (3) is configured to emit UV radiation by the radiation source (3.1) and detect UV radiation by the radiation detector (3.2).

In some embodiments, the radiation detector (3.2) is configured to detect radiations in various wavelengths and comprises a spectrometer.

Figure 3:
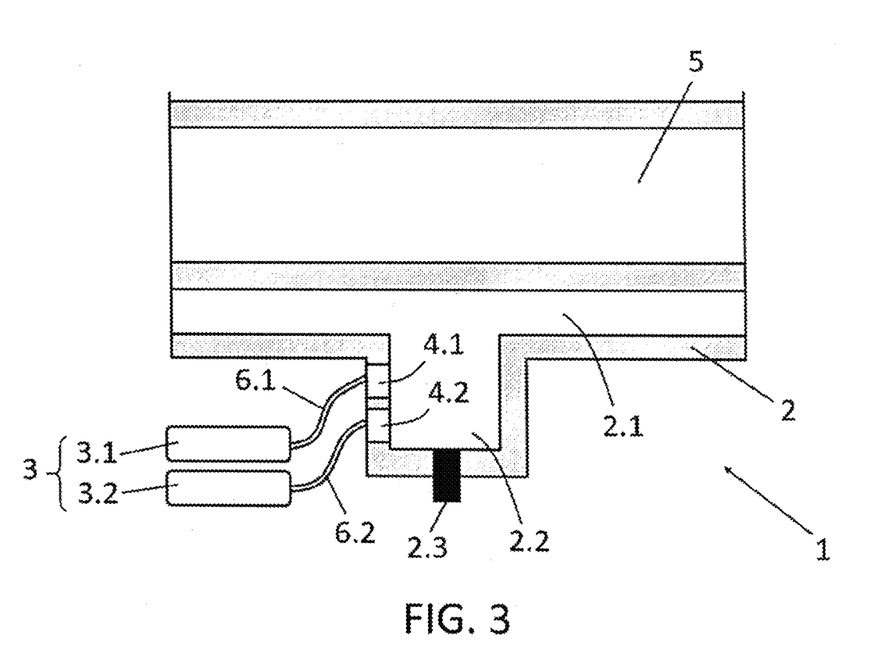
FIG. 3 shows a schematic view of the aircraft system according to a third embodiment of the invention.

FIG. 3 shows an exemplary embodiment of an aircraft system (1) comprising a vacuum jacket or enclosure (2) enclosing a liquid hydrogen pipe (5) such as the embodiment shown on FIG. 1. In particular, in the embodiment of FIG. 3 the detection system (3) comprises a first optical fiber (6.1) for transmitting UV radiation into the enclosed space (2.1) and a second optical fiber (6.2) for receiving radiation from the enclosed space (2.1).

Figure 4:
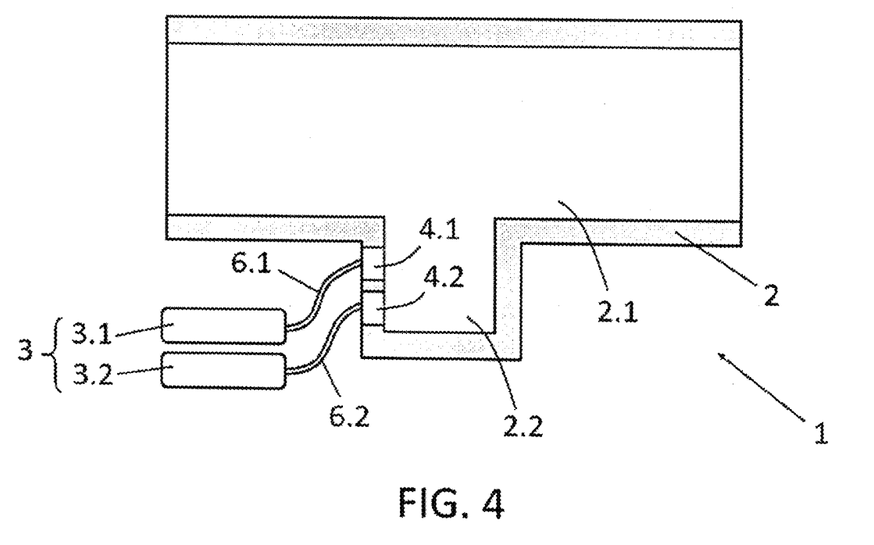
FIG. 4 shows a schematic view of the aircraft system according to a fourth embodiment of the invention.

FIG. 4 shows an embodiment of an aircraft system (1) comprising an encapsulation or enclosure (2) enclosing a fuel cell as in the embodiment of FIG. 2. In the embodiment of FIG. 4 the detection system (3) comprises a first optical fiber (6.1) for transmitting UV radiation into the enclosed space (2.1) of the enclosure and a second optical fiber (6.2) for receiving radiation from the enclosed space (2.1).

According to both FIGS. 3 and 4, the first optical fiber (6.1) is connected to the radiation source (3.1) of the detection system (3) so that the UV radiation is transmitted through the first window (4.1). Additionally, the second optical fiber (6.2) is connected to the radiation detector (3.2) to detect radiation from the enclosed space (2.1) through the second window (4.2). In an embodiment, a lens (not shown) may be arranged at the end of one or both optical fibers (6.1, 6.2) closest to the first (4.1) or second (4.2) window, respectively.

Figure 5:
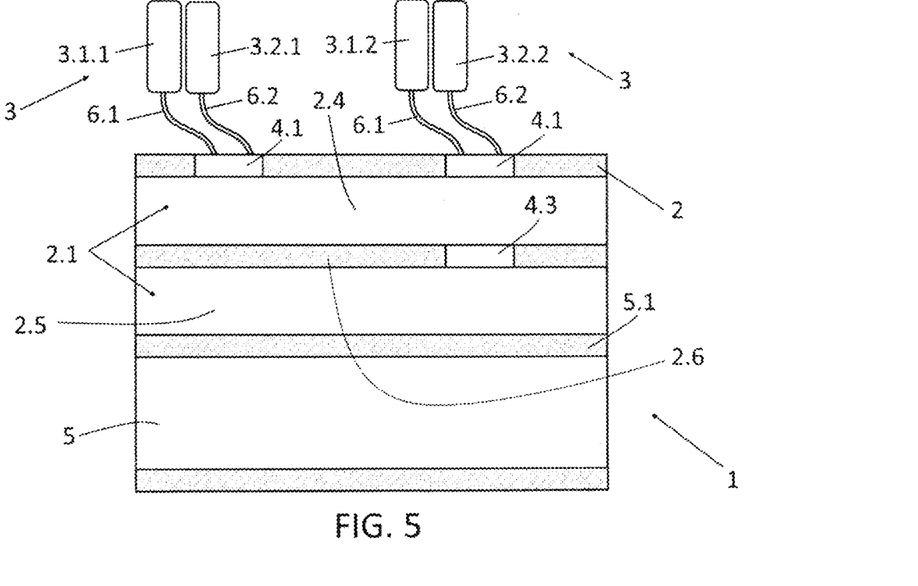
FIG. 5 shows a schematic view of the aircraft system according to a fifth embodiment of the invention.

FIG. 5 shows another exemplary embodiment of an aircraft system (1) that comprises a vacuum jacket or enclosure (2) enclosing a liquid hydrogen pipe (5), where there is vacuum between the wall (5.1) of the liquid hydrogen distribution pipe (5) and the vacuum jacket (2). Specifically, the enclosed space (2.1) comprises two vacuum spaces, a first vacuum space (2.4) with medium vacuum regime and a second vacuum space (2.5) with an ultra-high vacuum regime. These vacuum spaces (2.4, 2.5) are separated and isolated from each other by an intermediate wall (2.6). That is, there is an intermediate wall (2.6) housed in the enclosed space (2.1) which separates the first vacuum space (2.4) from the second vacuum space (2.5). Also, in this embodiment the detection system (3) comprises two radiation sources (3.1.1, 3.1.2) and two radiation detectors (3.2.1, 3.2.2). The first radiation source (3.1.1) is configured to emit electromagnetic radiation into the first vacuum space (2.4) and the second radiation source (3.1.2) is configured to emit electromagnetic radiation into the first (2.4) and second (2.5) vacuum space. The first radiation detector (3.2.1) is configured for detecting gas inside the first vacuum space (2.4) and the second radiation detector (3.2.2) is configured for detecting gas inside the first vacuum space (2.4) and the second vacuum space (2.5).

Moreover, the aircraft system (1) shown on FIG. 5 further comprises two first windows (4.1) arranged on the enclosure (2). Both radiation sources (3.1.1, 3.1.2) emit electromagnetic radiation into the first vacuum space (2.4) and both radiation detectors (3.2.1, 3.2.2) receive electromagnetic radiation from the inside of the first vacuum space (2.4) through the first windows (4.1).

In addition, there is an intermediate window (4.3) arranged on the intermediate wall (2.6) for allowing the passage of radiation between the first vacuum space (2.4) and the second vacuum space (2.5). In this case, the second radiation source (3.1.2) emits electromagnetic radiation from the outside of the enclosure (2) into the enclosed space (2.1) so that the radiation passes through the first window (4.1) towards the first vacuum space (2.4), and continues to the second vacuum space (2.5) through the intermediate window (4.3). In this particular embodiment, one of the first windows (4.1) and the intermediate window (4.3) are facing in the path of the electromagnetic radiation emitted by the second radiation source (3.1.2). This emitted radiation causes the excitation of the gas molecules (if any) present in both first vacuum space (2.4) and second vacuum space (2.5) when the gas molecules interact with the radiation emitted by the second radiation source (3.1.2). This interaction between the gas molecules and the emitted radiation causes the emission of radiation that is detected by the second radiation detector (3.2.2) from the outside of the enclosure (2). That is, the second radiation detector (3.2.2) detects electromagnetic radiation from the inside of the first vacuum space (2.4) and the second vacuum space (2.5).

Thus, the first radiation detector (3.2.1) is configured to detect gas within the first vacuum space (2.4) and the second radiation detector (3.2.2) is configured to detect gas within the first vacuum space (2.4) and the second vacuum space (2.5). In this embodiment, if the first radiation detector (3.2.1) detects the presence of gas, it is determined that the medium vacuum is lost. On the contrary, if the second radiation detector (3.2.2) detects the presence of gas and the first radiation detector (3.2.1) does not detect the presence of gas, it is determined that the ultra-high vacuum is lost.

In a particular example, a spectrometer comprised in the radiation detector (3.2, 3.2.1, 3.2.2) uses the Rayleigh emission, emitted by the excited gas molecules, to determine the presence of gas inside the enclosure (2). In another example, a spectrometer comprised in the radiation detector (3.2, 3.2.1, 3.2.2) uses the Raman emission, emitted by the excited gas molecules, to determine the nature of a gas comprised in the enclosure (2). Determining the gas present in the enclosure allows to determine which wall of the vacuum enclosure is leaking.

In the embodiment of FIG. 5 the detection system (3) comprises a first optical fiber (6.1) for transmitting UV radiation into the enclosed space (2.1) and a second optical fiber (6.2) for receiving radiation from the enclosed space (2.1). In other embodiments a single optical fiber may be used to transmit radiation in both directions.

In an example (not shown on figures), the aircraft system (1) comprises a plurality of detection systems (3) (as above already described) arranged at a plurality of locations to interact with the enclosed space (2.1) of the enclosure (2) along the enclosure (2). In a more particular example, the enclosure (2) comprises a plurality of observation chambers (2.3) each one used to monitor and determine the presence of gas inside.

The aircraft systems (1) shown on FIGS. 1, 3 and 5 are intended to determine the presence of gas in the enclosed space (2.1) of a vacuum jacket or enclosure (2) in order to detect vacuum leaks. On the other hand, the aircraft systems (1) shown on FIGS. 2 and 4 are intended to determine the presence of gas in the enclosed space (2.1) of a fuel cell encapsulation or enclosure (2) in order to detect the risk of and/or the creation of fire.

Figure 6:
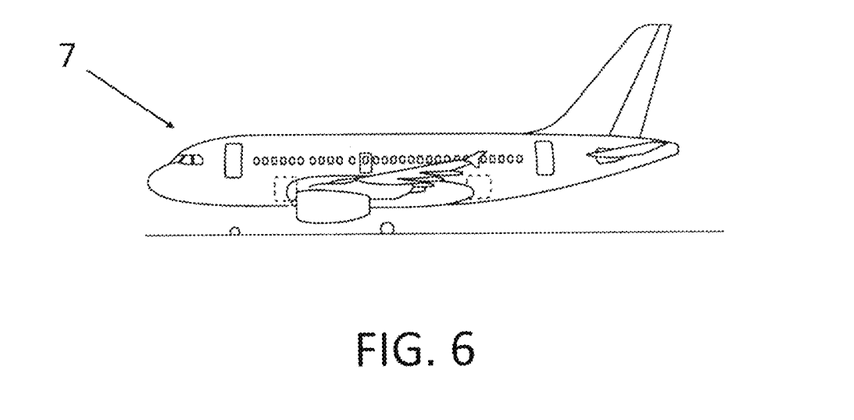
FIG. 6 shows a schematic view of the aircraft system according to a sixth embodiment of the invention.

FIG. 6 shows another exemplary embodiment of an aircraft system (1) that comprises an enclosure (2) and a detection system. In this embodiment the detection system comprises transmission optics (8.1) configured to direct radiation from the radiation source (3.1) into the enclosed space (2.1) and reception optics (8.2) configured to receive radiation from the enclosed space (2.1). The transmission optics (8.1) is adapted to form at least one radiating beam and may comprise one or more optical elements, such as lenses or mirrors. The reception optics (8.2) has a field of view from which it may receive radiations. The reception optics (8.2) may comprise one or more optical elements, such as lenses or mirrors.

In the embodiment of FIG. 6 the transmission optics (8.1) is fiber-coupled (i.e., coupled via optical fiber) to the radiation source (3.1). Also, in this embodiment the reception optics (8.2) is fiber-coupled to the radiation detector (3.2). This allows arranging the radiation source and the radiation detector remotely from the enclosure (2). However, in other embodiments the transmission optics (8.1) is coupled to the radiation source (3.1) without optical fiber and/or the reception optics (8.2) is coupled to the radiation detector (3.2) without optical fiber.

In the embodiment of FIG. 6, the transmission optics (8.1) and the reception optics (8.2) are arranged such the at least one radiating beam (9.1) from the transmission optics (8.1) and the field of view (9.2) of the reception optics (8.2) intersect forming a non-zero angle at an intersecting region (9.3) within the enclosed space (2.1). As shown in FIG. 6, the transmission optics (8.1) and the reception optics (8.2) are oriented such that the direction (8.1.1) in which the radiation enters the enclosure and the direction (8.1.2) in which radiation enters the reception optics (8.2) from the enclosure (2) form a non-zero angle. Also, in this embodiment the intersecting region (9.3) where the at least one radiating beam (9.1) from the transmission optics (8.1) and the field of view (9.2) of the reception optics (8.2) intersect does not comprise any portion of the enclosure (2), i.e., the intersecting region (9.3) and the enclosure (2) do not intersect.

Detection of Raman scattered radiation allows determining the type of gas, but Raman scattering provides a weak response. On the other hand, Rayleigh emissions provide a response which may be 10,000 times stronger, thus potentially allowing a much greater sensitivity to the loss of vacuum, but do not allow the type of gas to be determined. This additional sensitivity may allow a much earlier detection of loss of vacuum integrity. However, Rayleigh emissions from the enclosure material may introduce noise in the detection, thus potentially impairing accuracy in the detection of loss of vacuum integrity.

In some embodiments, Rayleigh emissions are filtered out to ensure that only the Raman emissions are seen. The embodiment of FIG. 6 provides a different way to improve the sensitivity of the detection. Advantageously, thanks to the arrangement of the transmission optics (8.1) and the reception optics (8.2) in the embodiment of FIG. 6, the intersecting region (9.3) does not intersect the enclosure (2) and Rayleigh emissions from the material of the enclosure (2) are not within the field of view of the reception optics (8.2), thus minimizing any potential contribution of Rayleigh emissions from said material to the detection performed. As a result, noise caused by Rayleigh emissions from the enclosure material are minimized in the signal obtained by the radiation detector (3.2).

Furthermore, the separation of the transmission optics (8.1) and the reception optics (8.2) as shown in FIG. 6, ensures that any Rayleigh emission from the transmission optics (8.1) is also not detected by the reception optics (8.2)

In the embodiment of FIG. 6, the enclosure (2) comprises two receptacles for receiving the transmission optics (8.1) and the reception optics (8.2). Thus, in this embodiment the radiation enters and leaves the enclosure without going through any window.

The embodiment of a detection system as the one disclosed in connection with FIG. 6 may be applied in combination with any embodiment of the enclosure (2), such as an encapsulation of a fuel cell or a vacuum jacket of a distribution pipe or tank.

Also, the embodiment of a detection system as the one disclosed in connection with FIG. 6 may be applied in combination with an embodiment of the enclosure (2), wherein the enclosure comprises an observation chamber (not shown), such that the transmission optics directs the radiation from the radiation source into the observation chamber and the reception optics receives radiation from the observation chamber.

A method for detecting vacuum leak by means of the gas detection inside an aircraft system (1) is described below. In this example, the aircraft system (1) is according to the embodiment shown on FIG. 1.

The method comprises the following steps:
  (a) emitting UV light into the enclosed space (2.1) by the radiation source (3.1) of the detection system (3).

First, the radiation source (3.1) emits UV light through the first window (4.1) towards the enclosed space (2.1) housed in the observation chamber (2.3) of the enclosure (2).

(b) monitoring, by the radiation detector (3.2) of the detection system (3), the presence of light emitted by gas molecules present in the enclosed space (2.1) when the gas molecules interact with the UV light emitted by the radiation source (3.1).

The emission of UV light from the radiation source (3.1) into the enclosed space (2.1) of the enclosure (2) causes the excitation of the gas molecules present in the enclosed space (2.1), if any. The excitation of these gas molecules in turn causes the gas molecules to emit light. This light emitted by the gas molecules is then detected by the radiation detector (3.2) from the outside of the enclosure (2) through the second window (4.2).

(c) determining the presence of gas in the enclosed space (2.1) based on the monitored presence of light.

If the radiation detector detects radiation above a set threshold coming from the enclosed space, it is determined that there is gas in the enclosed space. If no radiation above a set threshold is detected by the radiation detector, it is determined that there is no leak of the enclosed space. The set threshold refers to the amount of radiation detected, that is, the number of detected photons. When there is a detected radiation above a set threshold, according to the emitted light wavelength the type and/or the composition of the gas present in the enclosed space can be determined. In an embodiment where the method is used to detect vacuum leaks in a vacuum jacket of a pipe or tank, identification of the gas present in the enclosed space is useful to determine where the leak is. For example, if $H_2$ is detected inside the vacuum jacket (2), it is determined that an internal leak from the pipe (5) or tank exists, thus being indicative of an integrity failure of the pipe (5) or tank. In another example, if nitrogen and/or oxygen are detected inside the vacuum jacket (2), it is determined that an external leak from the environment exists, thus being indicative of an integrity failure of the vacuum jacket.

A method for detecting fire creation by means of the gas detection inside an enclosed space (2.1) is described below. In this example, the aircraft system (1) is according to the embodiment shown on FIG. 2. This method comprises the steps already defined in the above example.

In particular to the fire prevention or detection, according to the intensity of emitted light and specific wavelengths the oxygen and/or $H_2$ concentration can be determined. In an embodiment, when a concentration of an inflammable gas exceeds a predefined threshold a warning signal is generated in order to trigger a system isolation to prevent a fire or stop the spread of fire.

Another example of a method for detecting vacuum leak by means of the gas detection inside an aircraft system is described below. In this example, the aircraft system (1) is according to the embodiment shown on FIG. 5.

The method comprises the following steps: (a) emitting UV light into the first vacuum space (2.4) by the first radiation source (3.1.1) of the detection system (3) and also into the first (2.4) and second (2.5) vacuum space by the second radiation source (3.1.2).

The first radiation source (3.1.1) emits UV light through one first window (4.1) towards the first vacuum space (2.4). The second radiation source (3.1.2) emits UV light through another first window (4.1) towards the first vacuum space (2.4) and second vacuum space (2.5) so that the UV light first goes through the first vacuum space (2.4) and then passes to the second vacuum space (2.5) through the intermediate window (4.3) of the intermediate wall (2.6).

(b) monitoring, by the first radiation detector (3.2.1) of the detection system (3), the presence of light emitted by gas molecules present in the first vacuum space (2.4) when the gas molecules interact with the UV light emitted by the first radiation source (3.1.1), and/or monitoring, by the second radiation detector (3.2.2), the presence of light emitted by gas molecules present in the first (2.4) and/or second (2.5) vacuum space when gas molecules interact with the UV light emitted by the second radiation source (3.1.2).

The emission of UV light from the first radiation source (3.1.1) into the first vacuum space (2.4) causes the excitation of the gas molecules present in first vacuum space (2.4), if any. The excitation of these gas molecules in turn causes the gas molecules to emit light. This light emitted by the gas molecules is then detected by the first radiation detector (3.2.1) from the outside of the enclosure (2) through one of the first windows (4.1). In addition, the emission of UV light from the second radiation source (3.1.2) into the first vacuum space (2.4) and second vacuum space (2.5) causes the excitation of the gas molecules present in first vacuum space (2.4) and/or second vacuum space (2.5), if any. The excitation of these gas molecules in turn causes the gas molecules to emit light. This light emitted by the gas molecules is then detected by the second radiation detector (3.2.2) from the outside of the enclosure (2) through another first window (4.1).

(c) determining the presence of gas in any of the first vacuum space (2.4) and second vacuum space (2.5) based on the detected light.

If the first radiation detector (3.2.1) detects radiation above a set threshold coming from the first vacuum space (2.4), it is determined that there is gas in the first vacuum space (2.4) and therefore the medium vacuum is lost. If the second radiation detector (3.2.2) detects radiation above a set threshold coming from any of the first (2.4) and second (2.5) vacuum spaces, and if no radiation above a set threshold is detected by the first radiation detector (3.2.1), it is determined that there is gas in the second vacuum space (2.5) and therefore the ultra-high vacuum is lost. If no radiation above a set threshold is detected by any of the first (3.2.1) or second (3.2.2) radiation detector, it is determined that there is no excess of gas in any of the first (2.4) and second (2.5) vacuum spaces.

Figure 7:
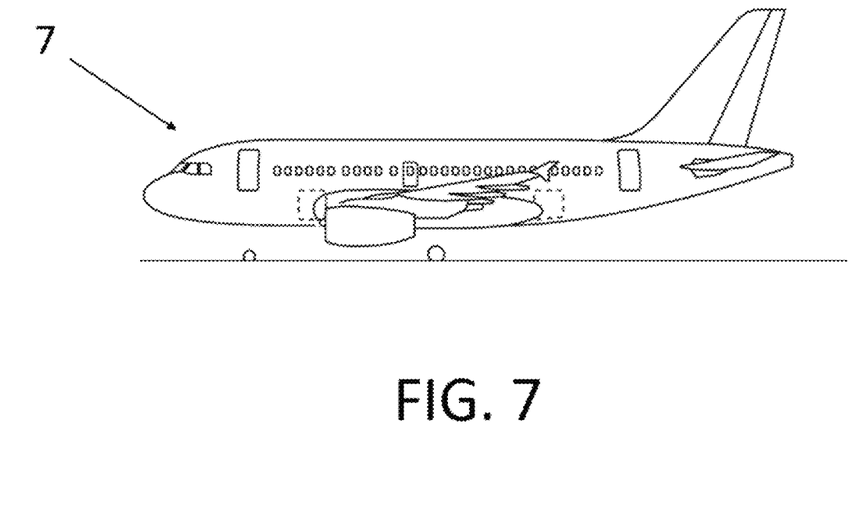
FIG. 7 shows a schematic view of an aircraft according to an embodiment of the present invention.

FIG. 7 shows an aircraft (7) according to the present invention. The aircraft (7) comprises on board an aircraft system (1) as described for any of FIGS. 1 to 6.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft system comprising:
   an enclosure defining an enclosed space within an aircraft, and
   a detection system within the aircraft and configured to detect gas inside the enclosed space, the detection system comprising:
      a radiation source outside the enclosed space and configured to emit electromagnetic radiation into the enclosed space to excite gas molecules within the enclosed space, and
      a radiation detector outside the enclosed space and configured to receive electromagnetic radiation scattered by the gas molecules excited by the electromagnetic radiation within the enclosed space,
         wherein the radiation detector is configured to detect whether the electromagnetic radiation scattered by the gas molecules exceeds a threshold.

2. The aircraft system according to claim 1, wherein the electromagnetic radiation emitted from the radiation source is ultraviolet (UV) light electromagnetic radiation.

3. The aircraft system according to claim 1, wherein the radiation received by the radiation detector is ultraviolet (UV) light electromagnetic radiation.

4. The aircraft system according to claim 1, wherein the radiation detector includes a spectrometer and the electromagnetic radiation received by the radiation detector is visible light radiation.

5. The aircraft system according to claim 1, wherein the detection system comprises at least one optical fiber arranged to transmit the electromagnetic radiation emitted from the radiation source to the enclosed space, and/or to transmit electromagnetic radiation from the enclosed space to the radiation detector.

6. The aircraft system according to claim 1, wherein the detection system comprises:
   transmission optics configured to direct the electromagnetic radiation emitted by the radiation source into the enclosed space, such that the transmission optics is adapted to form at least one radiating beam from the electromagnetic radiation, and
   reception optics configured to receive the electromagnetic radiation from the enclosed space, such that the reception optics has a field of view from which the reception optics receives the electromagnetic radiation,
   wherein the transmission optics and the reception optic are arranged such that the radiating beam and the field of view intersect with a non-zero angle at an intersecting region within the enclosed space, and
   wherein the transmission optics and the reception optics are arranged such that the intersecting region does not intersect any portion of the enclosure.

7. The aircraft system according to claim 1, wherein the enclosure is:
   an encapsulation of a fuel cell in the aircraft; or
   a vacuum jacket of a distribution pipe or tank in the aircraft.

8. The aircraft system according to claim 1, wherein
   the enclosed space comprises a first vacuum space and a second vacuum space, wherein the second vacuum space is separated by an intermediate wall from the first vacuum space;
   the radiation source of the detection system is configured to emit the electromagnetic radiation into the first vacuum space and the second vacuum space;
   the radiation detector of the detection system includes a first radiation detector configured to receive the electromagnetic radiation from inside of the first vacuum space; and
   the detection system further comprises a second radiation detector arranged outside the enclosed space, wherein the second radiation detector is configured to receive the electromagnetic radiation from inside of the first vacuum space and the second vacuum space.

9. The aircraft system according to claim 8, wherein the intermediate wall comprises an intermediate window, and
   the detection system is configured to emit electromagnetic radiation into the second vacuum space and/or receive electromagnetic radiation from the second vacuum space passing through the first window and the intermediate window.

10. The aircraft system according to claim 1, wherein the enclosure comprises at least a first window through which the detection system is configured to emit the electromagnetic radiation into the enclosed space and/or receive the electromagnetic radiation from inside of the enclosed space.

11. The aircraft system according to claim 1, wherein the enclosure comprises a first window through which the radiation source is configured to emit the electromagnetic radiation into the enclosed space, and
   a second window through which the radiation detector is configured to receive the electromagnetic radiation scattered by the gas from the enclosed space.

12. The aircraft system according to claim 1, wherein:
   the enclosure comprises an observation chamber,
   the radiation source is configured to emit electromagnetic radiation into the observation chamber, and
   the radiation detector is configured to receive electromagnetic radiation from the observation chamber.

13. The aircraft system according to claim 1, further comprising a plurality of the detection systems.

14. An aircraft comprising the aircraft system according to claim 1.

15. An aircraft system comprising:
   an enclosure defining an enclosed space within an aircraft, and
   a detection system outside of the enclosed space and within the aircraft, wherein the detection system includes:
      a radiation source within the aircraft, outside the enclosed space and configured to emit a first electromagnetic radiation into the enclosed space;
      a first radiation path for the first electromagnetic radiation from the radiation source to inside of the enclosed space,
      a second radiation path for a second electromagnetic radiation extending from the inside of the enclosed space, wherein the first radiation path and the second radiation path intersect within the enclosed space at an acute angle, and
      a radiation detector within the aircraft, outside the enclosed space and configured to receive the second electromagnetic radiation passing along the second radiation path,
   wherein the first electromagnetic radiation excites gas molecules in the enclosed space,
   wherein the second electromagnetic radiation is scattered by the excited gas molecules within the enclosed space, and
   wherein the radiation detector is configured to detect whether the second electromagnetic radiation scattered by the excited gas molecules exceeds a threshold.

16. The aircraft system of claim 15, wherein the enclosed space is hermetically sealed within the enclosure.

17. The aircraft system of claim 15, wherein the enclosed space is an encapsulation of a fuel cell in the aircraft; or a vacuum jacket of a distribution pipe or tank in the aircraft.

18. A method for determining presence of a gas inside an enclosed space of an aircraft system within an aircraft, the method comprising:
   emitting electromagnetic radiation into an enclosed space within the aircraft from a radiation source outside the enclosed space and within the aircraft;
   monitoring for electromagnetic radiation scattered by gas molecules in the enclosed space, wherein the electromagnetic radiation is scattered in response to the radiation emitted by the radiation source into the enclosed space, and
   determining the presence of the gas in the enclosed space based on whether the scattered electromagnetic radiation in the enclosed space exceeds a threshold.

* * * * *